March 11, 1941.  F. PEROSA  2,234,351
PLOW UNIT
Filed June 3, 1939
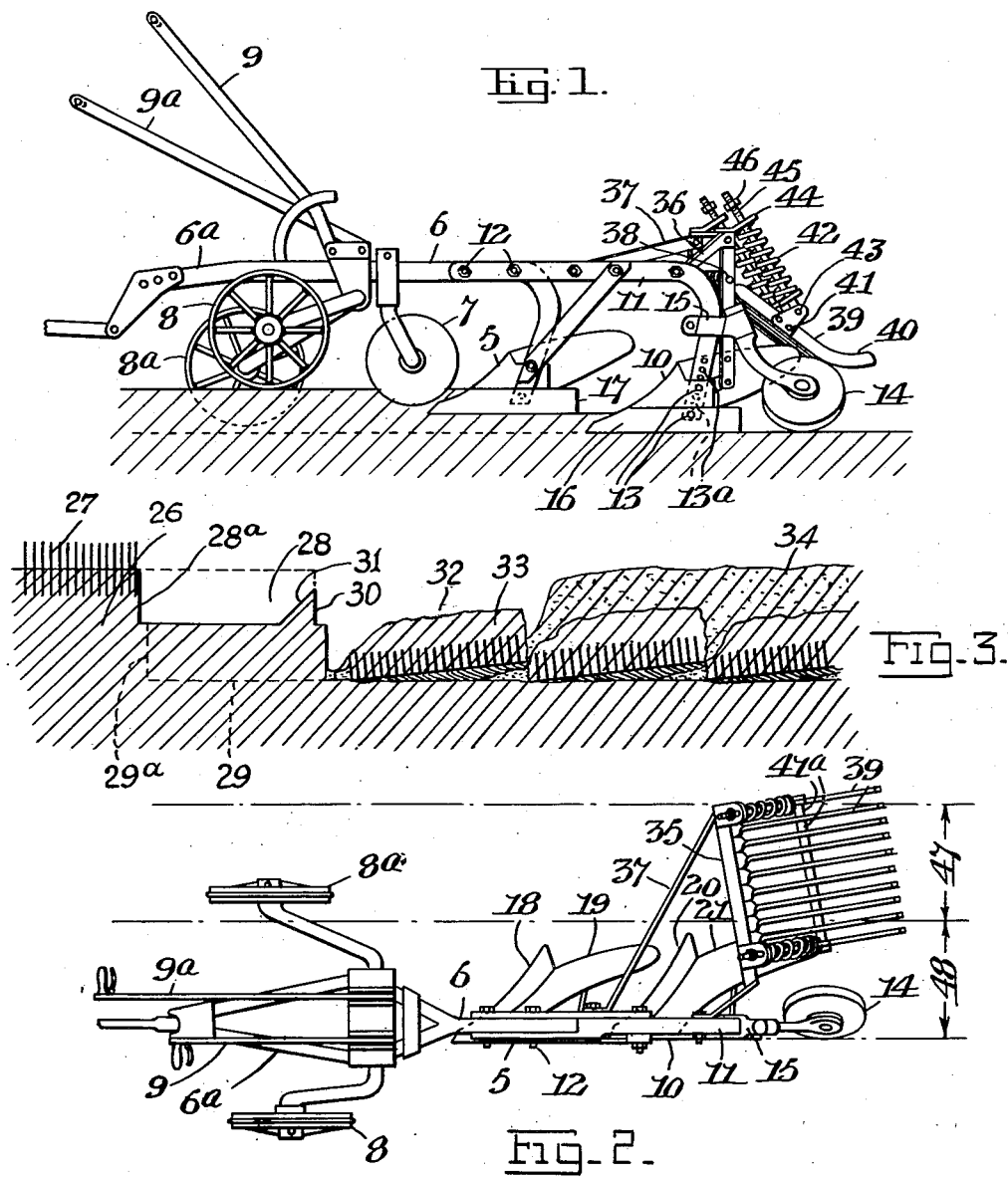
Inventor:
Frank Perosa,
by Harris S. Campbell
Atty.

Patented Mar. 11, 1941

2,234,351

UNITED STATES PATENT OFFICE 2,234,351

PLOW UNIT

Frank Perosa, Willow Grove, Pa.

Application June 3, 1939, Serial No. 277,223

5 Claims. (Cl. 97—80)

This invention relates to plows and particularly to plow units in which two plows are arranged in tandem fashion.

With the usual plow unit, each furrow is cut and turned in a single continuous piece. It is an object of the present invention to provide a plow unit which will turn each furrow in a different fashion, namely by turning the top part of each furrow first so that the top part is deposited in the bottom of the trench made by the previous furrow and the bottom of the furrow is deposited on top of the newly turned ground.

One phase of this invention contemplates the manufacture of a plow attachment part which may be fastened to the rear of an existing single plow unit so that it may be transformed into a tandem plow unit.

An object of the invention is to provide a tandem plow unit in which the rear plow is set to plow, not only deeper but at a small distance laterally offset from the front plow, the offset being in the direction toward which the furrow is being turned. This offset relationship provides for improved operation since it maintains more evenly distributed pressure on the two plows so that they cut the furrow with no tendency toward instability and with less power. It will be seen that this offset arrangement also prevents the lower rear plow from the possibility of digging into the uncut sod at any point which action might tend to disturb the equilibrium and cause a jerk producing sudden increase in the draw-bar force.

A still further object of the invention is to provide a tandem plow combination in which the front plow has a narrower share and moldboard than the rear plow. With this arrangement improved operation results since the front furrow is not thrown sufficiently far to stand up in the previously turned furrow, as occurs in the normal system of plowing. When the narrower front share is used, the top cut of the furrow is turned over and falls completely reversed into the lower part of the furrow left by the rear plow on the previous trip. In this way all the sod, grass, straw, etc., is deposited completely into the bottom of the furrow and the wider, rear plow throws the loose earth entirely over to cover any roots or grass which may be exposed. With this arrangement a comparatively smooth, well broken surface is produced and very little discing or other finish working is required.

I have found that when my improved plow unit is used higher operating speeds can be maintained using less power than with the ordinary single plow unit. This plow unit also is effective in weed control and for depositing top soil well underneath the surface where the soil is improved in richness, causing deep rooted crops.

In order to produce improved surface conditions after plowing with my tandem plow unit, an object of the invention is to provide a compact leveller attachment for use with the tandem plow unit which further improves the ground surface condition.

How these and other objects of the invention are accomplished will be evident from the following description of the drawing in which:

Figure 1 is a side elevation of the tandem plow unit.

Figure 2 is a plan view of the tandem plow unit including the leveller attachment.

Figure 3 is a cross section of ground illustrating the condition after being plowed with a tandem plow unit of the present invention.

From Figure 1 it will be seen that the forward portion of the plow unit, including the front plow is substantially similar to a regular single plow such as normally used to be drawn behind a tractor. The front plow 5 is mounted on a frame 6 which projects forwardly in a suitable fashion to support the circular sod cutting knife 7 and the wheels 8 and 8a. The wheels are adjustable as to height by means of levers 9 and 9a, so as to provide for plowing to different depths and for the purpose of raising the plows out of the ground when not in use. The front end of frame 6 projects forwardly as shown at 6a to provide for a convenient point of attachment for a tractor draw bar (not shown). Rear plow 10 is mounted on a frame member 11 which is attached to the front frame 6 by means of bolts 12, so that frame 11 forms a continuation of frame 6 and supports the rear plow 10 in approximate longitudinal alignment with the front plow 5. Both the front frame 6 and a rear frame 11 are curved downwardly at the rear portion of each to provide for mounting the respective plows. The rear plow 10 is attached to the frame 11 by means of bolts 13, there being additional holes 13a provided in the frame member to allow for raising or lowering the rear plow 10 to adjust its height relatively to the front plow 5.

It will be noted that the curvature and shape of the rear frame 11 is generally similar to that of the front frame 6. This is an advantage in case conditions are encountered which make it desirable to transform the unit to a normal single plow unit. In this case the rear guide wheel 14 together with its mounting bracket 15 may be removed from the rear frame 11 and placed in corresponding position on front frame 6.

It will be noted that the point 16 of the rear plow share is located at a lower level and almost directly below the rear end of the landside shoe 17 of the front plow. This position of the rear plow relative to the front plow provides a compact unit for the two plows and also is of distinct advantage in plowing stony ground. Should the front plow hit a stone having a rounded top surface it tends to lift over it and in so doing raises the rear plow sufficiently so that its point is high enough to rise and ride over the stone. A single plow located at the depth of the rear plow would often be unable to ride over a stone which it encountered at this depth. I have found from experience that with my tandem plow unit, fewer plow points are damaged when plowing stony ground.

In Figure 2 it will be observed that the front plow share 18 and the front mold board 19 are slightly narrower than the share 20 and mold board 21 of the rear plow. This arrangement is the preferred form of the invention although satisfactory operation can be obtained with plows of the same size. The particular advantages of the preferred form will be discussed later.

With ordinary plowing each turned furrow lies in a comparatively solid piece in an angular attitude, leaning against the furrow which was turned on the previous trip. This produces a surface which is uneven with prominent ridges. Between these ridges often projects the grass and weed tops which were growing in the ground prior to plowing. Such a surface requires several operations after plowing, such as discing and dragging to break up the sod which remains near the surface and to level and break up the ground which tends to remain in a continuous single piece because of the roots.

In Figure 3 a typical section of ground is shown in the process of being plowed with my tandem plow unit. The section is taken through the ground at a point between the front and rear plows of the tandem plow unit. The unplowed ground is shown at 26 with vegetation indicated at 27. The depression 28 indicates the part turned by the front plow which cuts a furrow of sufficient depth to include most of the roots of the sodded portion. In actual practice, the depth of this furrow is usually about one half the depth of the finished furrow, although this can be adjusted to suit different ground conditions by the adjustment bolts for raising and lowering the rear plow of the unit. The completed cut is shown by dotted line 29. It will be noted that the furrow 28 is not cut completely to the edge 30, there being a small portion 31 left uncut by the narrower front plow share mentioned previously. Thus the narrower front plow and mold board causes the top layer of the furrow to be turned and deposited almost directly in the bottom of the preceding furrow 32. The sod portion turned from furrow 28 is shown at 33 turned almost completely top downwardly in the bottom portion of the previous furrow, in contrast to the leaning upright position assumed by the thicker single furrows produced by the usual type of plow.

As the rear plow passes, the portion of the earth within the dotted line 29 is turned over on top of the sod portion 33. The results of this are indicated by the previously turned ground shown at 34. Since there are no matting roots to retain the soil turned by the rear plow in a solid piece, it readily breaks and crumbles to form a comparatively loose and broken covering over the sodded portion previously deposited by the front plow. This provides a very desirable ground condition as it deeply buries the vegetable matter and roots so that they cannot continue to grow after being plowed under. As a result the vegetable matter decays and forms a deep layer of rich soil which is of value in causing deep rooted crops. The well broken top surface also permits ready entrance of moisture which penetrates to the rich lower portion of the cultivated ground with the result that the roots of the growing crops tend to grow downwardly to this region, instead of remaining close to the surface.

From Figure 2 it will be seen that the rear plow 10 is set on the frame in a position slightly offset to the plow share side as compared to the front plow 5. The nature of this offset will be more clearly understood by reference to Figure 3 where the outline of the portion of the furrow turned by the rear plow is indicated by dotted line 29. The offset of the rear plow will be evident by comparing the vertical line 29a with the vertical surface of the upper portion of the furrow indicated at 28a. Offsetting the rear plow in this fashion provides improved operation and eliminates any tendency for the rear plow to drag or dig into the side of the upper portion of the furrow cut by the front plow. In the actual construction this offset need only be a small distance amounting to about one half inch.

In order to further improve the surface results, I have provided a simple leveller device which can be attached to the rear end of my tandem plow unit. This device is shown in Figures 1 and 2. A frame member 35 is bolted to the rear moldboard 21 and retained in place by suitable supports 36 and 37. A bar 38 mounted in the frame 35 provides a pivot for a series of trailing strap shaped members 39 which project downwardly and rearwardly to contact the surface of the ground with their curved end portions 40. A rod member 41 and spacers 41a maintain all of the strap members 39 in properly aligned position. In order to provide a force to urge the bars or straps 39 into contact with the ground surface to a sufficient degree to cause adequate levelling action, a pair of springs, as indicated at 42, are provided, one at each end of the frame 35. Lower bracket 43 and upper bracket 44 provide for the mounting of each spring. Rods 45 maintain proper alignment and also provide for supporting the members 39 when the plow is out of the ground. A nut 46 provides an adjustable abutment to support the strap members 39 at the desired point. The use of the springs in this fashion provides for satisfactory levelling action of the device without the need for heavy parts.

It will be seen from Figure 2 that the leveller attachment is mounted on the frame at a slight angle to the direction of plowing. Also the width of the leveller device is sufficient to slightly overlap the furrow in its turned position. The furrow in its turned position is indicated in Figure 2 by space 47 between the dotted lines and the furrow being turned is indicated by a space 48. This position of the leveller attachment provides for some breaking up of the turned ground and its angular attitude produces a tendency to sideward movement of the earth to fill in any longitudinal depressions which may occur between the furrows. In view of the fact that the ground surface produced by my tandem plow arrangement is well broken up and no large clods or pieces of sod are near the surface, this simple leveller attachment is effective to produce a comparatively smooth and level ground surface.

From the foregoing description it will be seen that I have provided an improved plow unit which produces a highly desirable soil condition by a single plowing operation. The plow unit is compact and easily attached to a tractor and used in the same general fashion as existing plowing equipment. With my improved unit, time is saved in preparing the soil since some of the finishing operations normally required may be eliminated. For some crops, it is feasible to plant without further working after plowing.

I claim:

1. A device for attachment to a standard tractor-drawn plow to provide for turning a furrow in two layers, said device including a frame member for rigid attachment to the frame of the standard plow, said frame member having a plow member attached and being of a configuration to locate the plow member at a point substantially directly behind and at a lower level than on the plow of the standard unit, and means for adjusting the height of said plow member on said frame member.

2. A plow unit including a longitudinal frame, two plow members attached to said longitudinal frame in tandem fashion to turn each furrow in two layers, the rear plow of the tandem plows being set at a lower level than the front plow and having a greater width than the front plow, the rear plow further being offset relative to the front plow a slight distance to the moldboard side.

3. A plow unit for attachment to a tractor, said unit having a pair of plows arranged in tandem fashion, the front plow being attached to a longitudinal frame which curves downwardly to provide a depending support on which the front plow is bolted, a longitudinal frame extension bolted rigidly to the longitudinal frame of the front plow at a point forwardly of the curved portion, said longitudinal rear portion also curving downwardly to provide a support for attachment of the rear plow, a brace member bolted to the downward extension of the front longitudinal frame member and to the longitudinal rear extension, and means for adjusting the height of the rear plow relative to the front plow, said means being at the lower end of the rear extension at the point of attachment of the rear plow.

4. A plow unit having a pair of plow members arranged in tandem fashion including a longitudinal frame to which the front plow member is attached, a longitudinal frame extension to which the rear plow member is attached, said longitudinal extension being rigidly bolted to the first mentioned longitudinal frame in position to locate the second plow member at a position where the point of the second plow is substantially directly underneath the rear end of the shoe of the first plow, said rear plow member being of greater width than the front plow member.

5. A plow unit having a pair of plow members arranged in tandem fashion including a longitudinal frame to which the front plow member is attached, a longitudinal frame extension to which the rear plow member is attached, said longitudinal extension being rigidly bolted to the first mentioned longitudinal frame in position to locate the second plow member at a position where the point of the second plow is substantially directly underneath the rear end of the shoe of the first plow, said rear plow member being of greater width than the front plow member, a leveller attachment supported entirely on said longitudinal frame extension and removable therewith.

FRANK PEROSA.